US007945591B2

(12) United States Patent  
Kumar et al.

(10) Patent No.: US 7,945,591 B2
(45) Date of Patent: May 17, 2011

(54) IDENTIFYING PROBLEMS, USAGE PATTERNS, AND PERFORMANCE IN A DATABASE INTERFACE USING ASPECT-ORIENTED PROGRAMMING

(75) Inventors: Arun Kumar, Austin, TX (US); Rohit Singh, Weston, FL (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 11/154,162

(22) Filed: Jun. 16, 2005

(65) Prior Publication Data

US 2006/0288025 A1  Dec. 21, 2006

(51) Int. Cl.
*G06F 7/00* (2006.01)

(52) U.S. Cl. ............. 707/796; 707/693; 707/999.101; 714/38

(58) Field of Classification Search .................. None
See application file for complete search history.

(56) References Cited

U.S. PATENT DOCUMENTS

| 6,105,067 | A | 8/2000 | Batra ........................... 709/227 |
| 6,748,373 | B2 | 6/2004 | Messinger et al. ................. 707/2 |
| 7,080,126 | B2* | 7/2006 | Srivastava et al. ............. 709/206 |
| 7,080,145 | B2* | 7/2006 | Srivastava et al. ............. 709/226 |
| 2003/0058280 | A1* | 3/2003 | Molinari et al. .............. 345/771 |
| 2003/0149960 | A1* | 8/2003 | Inamdar ....................... 717/118 |
| 2003/0172076 | A1 | 9/2003 | Arnold et al. ................. 707/100 |
| 2003/0200282 | A1* | 10/2003 | Arnold et al. ................. 709/219 |
| 2003/0221182 | A1* | 11/2003 | Tip et al. ...................... 717/116 |
| 2004/0054695 | A1* | 3/2004 | Hind et al. ................... 707/200 |
| 2004/0059749 | A1 | 3/2004 | Frey et al. .................... 707/103 |
| 2004/0172390 | A1 | 9/2004 | Srivastava et al. ................ 707/3 |
| 2004/0205180 | A1 | 10/2004 | Srivastava et al. ............ 709/223 |
| 2005/0022157 | A1* | 1/2005 | Brendle et al. ................ 717/104 |
| 2005/0166193 | A1* | 7/2005 | Smith et al. .................. 717/143 |
| 2005/0273667 | A1* | 12/2005 | Shrivastava et al. ............ 714/38 |
| 2005/0273860 | A1* | 12/2005 | Chess et al. ..................... 726/25 |
| 2005/0289212 | A1* | 12/2005 | Tankov et al. ................ 709/200 |
| 2006/0271345 | A1* | 11/2006 | Kasuya .......................... 703/14 |
| 2006/0288025 | A1* | 12/2006 | Kumar et al. ................. 707/101 |

* cited by examiner

*Primary Examiner* — Wilson Lee
*Assistant Examiner* — Shyue Jiunn Hwa
(74) *Attorney, Agent, or Firm* — Dillon & Yudell LLP

(57) ABSTRACT

A method, computer program product, and data processing system for efficiently diagnosing errors and inefficiencies in database application code are disclosed. According to a preferred embodiment, techniques of aspect-oriented programming (AOP) are used to instrument database application code to monitor the usage of database resources. Specifically, pointcuts are defined to intercept accesses of database resources. Advice code associated with these pointcuts is used to collect information about the usage of database resources and to detect certain errors, such as resource leaks, when they occur. In a preferred embodiment, the AspectJ aspect-oriented programming language/system is used to define the pointcuts and advice code.

17 Claims, 15 Drawing Sheets

IDENTIFYING PROBLEMS, USAGE PATTERNS, AND PERFORMANCE IN A DATABASE INTERFACE USING ASPECT-ORIENTED PROGRAMMING

BACKGROUND OF THE INVENTION

1. Technical Field

The present invention relates generally to instrumentation, profiling, and debugging of computer programs. Specifically, the present invention is directed to a method, computer program product, and data processing system for instrumenting a database application to detect errors and performance issues.

2. Description of the Related Art

Databases are computerized information storage and retrieval systems. A Relational Database Management System (RDBMS) is a database management system (DBMS) that stores information as tables containing tuples of data. These tables define relations, which are mappings between associated items of data. The theory underlying relational databases was initially developed by in the early 1970s by Edgar F. Codd, a researcher at International Business Machines Corporation, who, in 1981, was awarded the Turing Award (the highest award in the Computer Science field) for his pioneering work.

RDBMS software using a Structured Query Language (SQL) interface is well known in the art. The SQL interface has evolved into a standard language for RDBMS software and has been adopted as such by both the American National Standards Organization (ANSI) and the International Standards Organization (ISO). In RDBMS software all data is externally structured into tables. The SQL interface allows users to formulate queries and data-modification operations on the tables interactively, as a batch process, or through SQL code that is embedded in a host language, such as C, C++, JAVA, COBOL, or the like.

Although other proprietary interfaces also exist, most modern, commercially-available database systems support a standard interface, known as ODBC (Open DataBase Connectivity), for allowing application code to access or modify a database in a well-defined manner. The JAVA programming language and runtime environment provides its own standard database interface, known as JDBC (JAVA DataBase Connectivity). In a typical JAVA-based database application, the application accesses the database through the standard interface provided by JDBC, while the actual connection to the database is performed by a database driver or adapter component, which serves as an intermediary between the standard JAVA runtime and the database. Typically, these drivers or adapters are specific to a particular database system or vendor (such as the DB2 database management system, a product of International Business Machines Corporation). JDBC is heavily used in developing applications for use in a J2EE (JAVA 2 Enterprise Edition) application server environment.

Like all programs, database applications are often prone to errors and inefficiencies (such as resource leaks, for instance). Traditionally, detecting these errors and inefficiencies has relied on tracing the execution of the application server runtime or the database runtime. In many cases, neither of these techniques is sufficient to diagnose the problem, and the additional performance overhead required to enable such techniques can seriously degrade the performance or behavior of the application.

What is needed, therefore, is a simpler and more efficient manner of diagnosing errors and inefficiencies in database application code. The present invention provides a solution to this and other problems, and offers other advantages over previous solutions.

SUMMARY OF THE INVENTION

The present invention provides a method, computer program product, and data processing system for efficiently diagnosing errors and inefficiencies in database application code. According to a preferred embodiment, techniques of aspect-oriented programming (AOP) are used to instrument database application code to monitor the usage of database resources. Specifically, pointcuts are defined to intercept accesses of database resources. Advice code associated with these pointcuts is used to collect information about the usage of database resources and to detect certain errors, such as resource leaks, when they occur. In a preferred embodiment, the AspectJ aspect-oriented programming language/system is used to define the pointcuts and advice code.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Before delving into the specifics of a preferred embodiment of the present invention, it is helpful to understand what is meant by aspect-oriented programming. A brief introduction to the basic concepts of aspect-oriented programming is provided here by way of illustration. Aspect-oriented programming is both a programming language paradigm as well as a scheme for the compilation and execution of programs.

Figure 1:
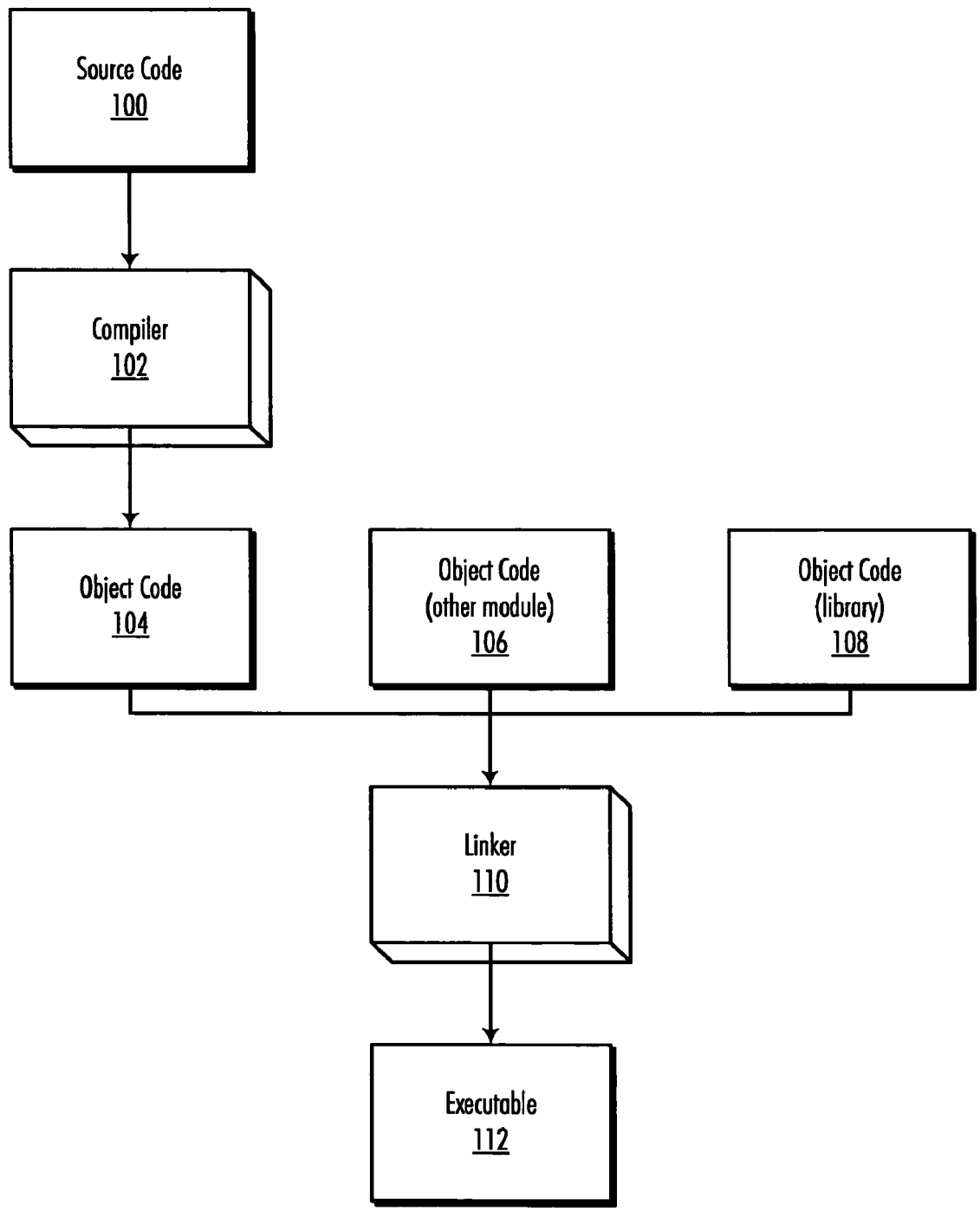
FIG. 1 is a diagram illustrating a traditional compile and link paradigm used in software development.

As shown in FIG. 1, under the traditional compilation paradigm for a computer program, source code 100 for the program is presented as input to a compiler 102, which translates source code 100 into object code 104. Object code 104 is made up of code in the native language of the computing platform (such as the hardware platform's native machine language or, in the case of a virtual machine such as a Java virtual machine, the executable bytecode the virtual machine is designed to execute). Object code 104 may be combined with other object code, such as other program modules 106 or library routines 108 by a linker 110. Linker 110 is used to combine the various individual modules of object code into an executable form 112.

Figure 2:
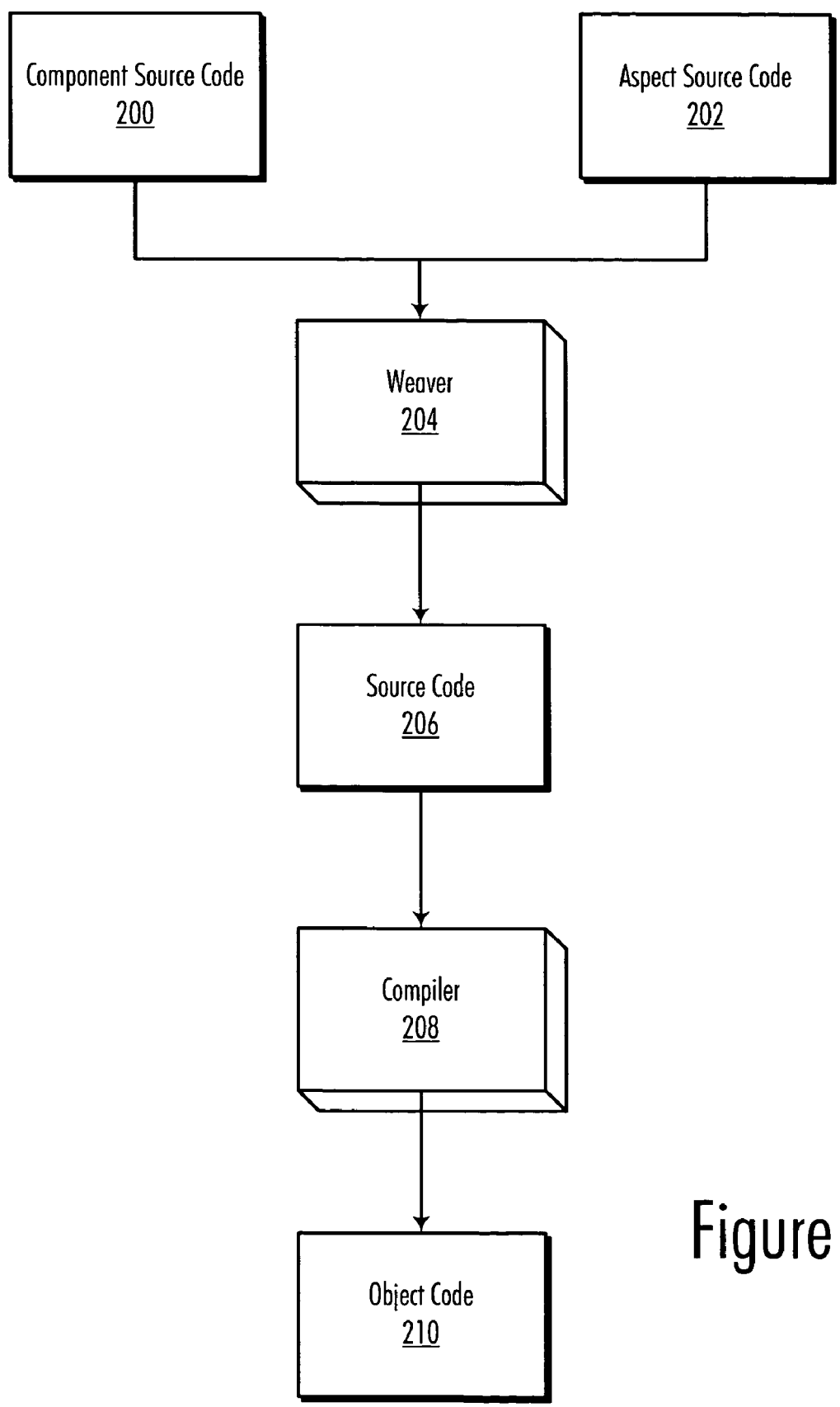
FIG. 2 is a diagram illustrating a compilation process utilizing aspect-oriented programming techniques, as might be applied to an embodiment of the present invention.

Aspect-oriented programming, on the other hand, adds an additional level of abstraction to the software development process. As shown in FIG. 2, a program is built from both component source code 200 and aspect source code 202. Component source code 200 is ordinary program code, much like source code 100 in FIG. 1. Aspect source code 202, on the other hand, is source code that operates on component source code 200 to modify and/or manipulate component source code 200 before inclusion into the final program. A development tool known as a weaver 204 performs the operations specified by aspect source code 202 on component source code 200 to obtain a resulting source code 206, which may be fed into a compiler 208 to obtain object code 210. Object code 210 may then be utilized in the same manner as object code 104 in FIG. 1.

Figure 3:
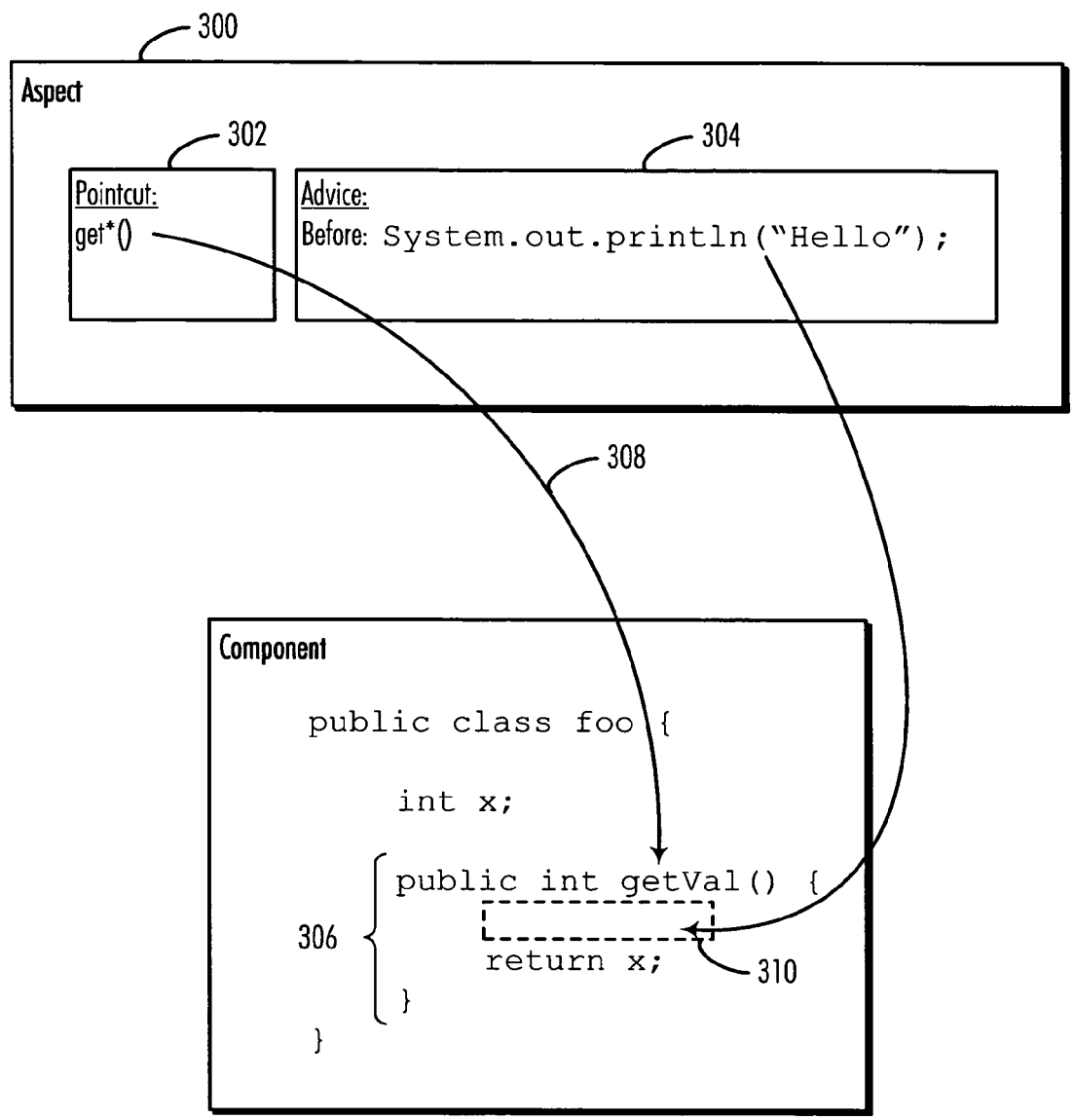
FIG. 3 is a diagram illustrating basic concepts of aspect-oriented programming as used in a preferred embodiment of the present invention.

The basic mechanism for modifying component source code 200 using aspect source code 202 is described in FIG. 3. Aspects source code, such as aspect source code 202 in FIG. 2, is comprised of aspects, such as aspect 300 in FIG. 3. Aspect 300 comprises a pointcut 302 and advice code 304.

Point cut 302 comprises a pattern that is used to identify particular features in the component source code (e.g., component source code 200 in FIG. 2). Advice code 304 contains program code that is used to modify features of the component source code identified by the pattern contained in pointcut 302. Some examples of advice to include "before advice" and "after advice" "Before advice" is code that is intended to execute before the code feature identified by the pattern in the pointcut. Similarly, "after advice" is program code that is intended to be executed after the code feature identified by the pattern in the pointcut.

As shown in the example provided in FIG. 3, pointcut 302 specifies a pattern that identifies all methods beginning with the word "get." (One skilled in the art will recognize that JAVA programs often utilize a naming convention wherein methods that set attributes of objects are prefixed with the word "set" and methods that access the values of attributes of objects are prefixed with the word "get." Objects that follow this naming convention are referred to as "JavaBeans.") Pointcut 302 will therefore identify any method having a name that begins with "get." One such method is method 306, shown in FIG. 3. The fact that pointcut 302 identifies method 306 is represented in FIG. 3 by arrow 308. Advice code 304 contains before advice consisting of code to print the word "Hello" on the display console. Thus, the full semantics of aspect 300 is to identify each method having a name that begins with "get" and add code to the beginning of each such identified method to print the word "Hello" on the display console. Hence, when an aspect weaver is applied to aspect 300 and method 306, the result is to insert before advice code 304 in location 310 at the beginning of method 306.

Thus, as can be seen from FIG. 3, aspect-oriented programming provides a convenient mechanism for making global changes to program by matching patterns in the program code. Aspect-oriented programming might be thought of (in a very crude sense) as a sophisticated form of search and replace (as in a text editor or work processor). However, aspect-oriented programming is much more powerful than a textual search and replace, because aspect-oriented programming is capable of making global modifications to a program based on semantic features of the program, rather than by raw text searching. One skilled in the art will recognize that the ability AOP provides to make global changes to a complete set of program features allows modifications that might otherwise have to be manually replicated across the entire program to be made in a single operation, without risk that some of the set of features might be overlooked (as might be the case if the program were edited manually).

Figure 4:
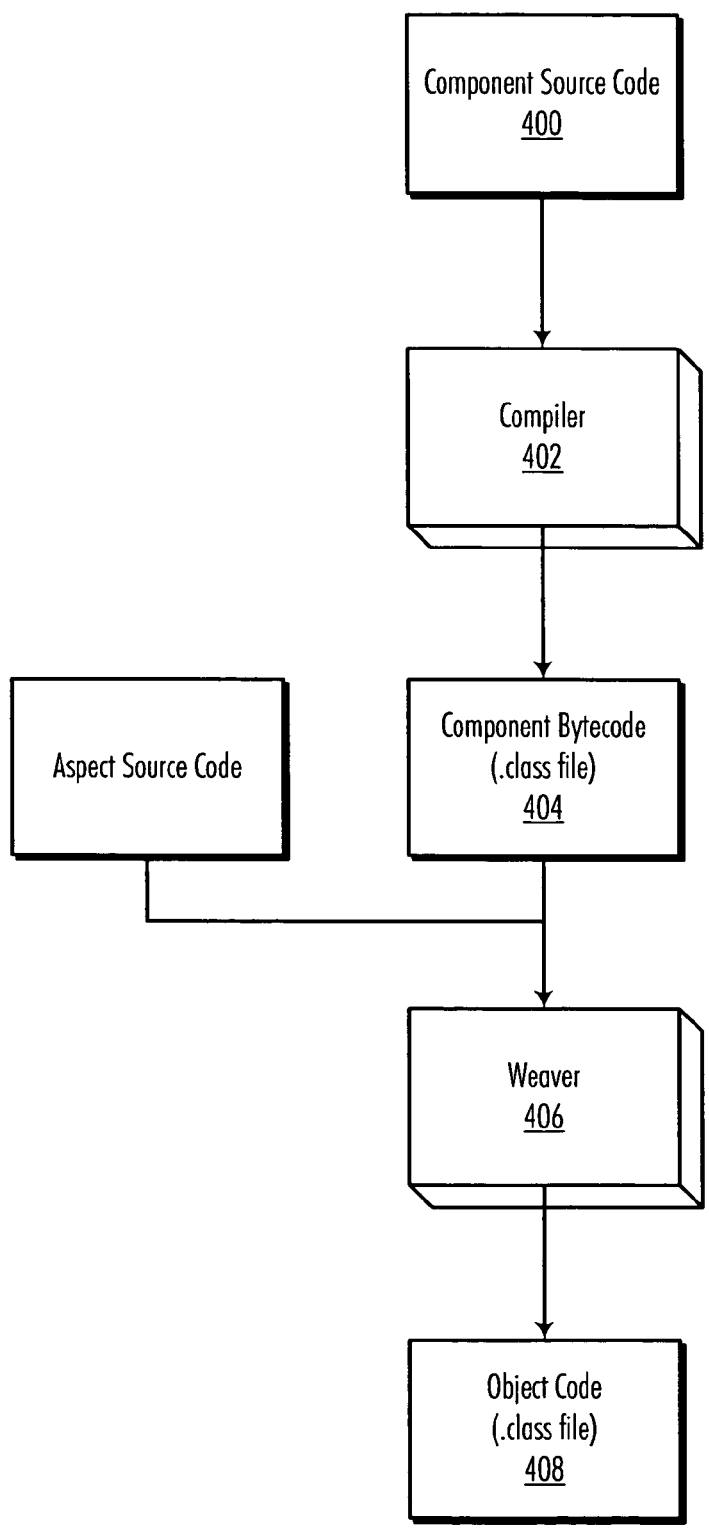
FIG. 4 is a diagram illustrating a process of instrumenting object code or bytecode, as might be applied to an embodiment of the present invention.

When dealing with component source code written in a language such as JAVA, which compiles predictably to a well-defined bytecode representation, even more sophisticated applications of aspect-oriented programming are possible. As shown in FIG. 4, one need not possess the actual component source code of the software to be modified using aspect-oriented programming. Aspects may be applied to well-defined byte code or object code (such as JAVA ".class" files). In the example depicted in FIG. 4, the original component source code (component source code 400) is already compiled (via compiler 402) into JAVA bytecode in the form of a ".class" file 404. Aspect source code 405 is then applied to bytecode 404 by weaver 406 to obtain resulting object code 308.

Figure 5:
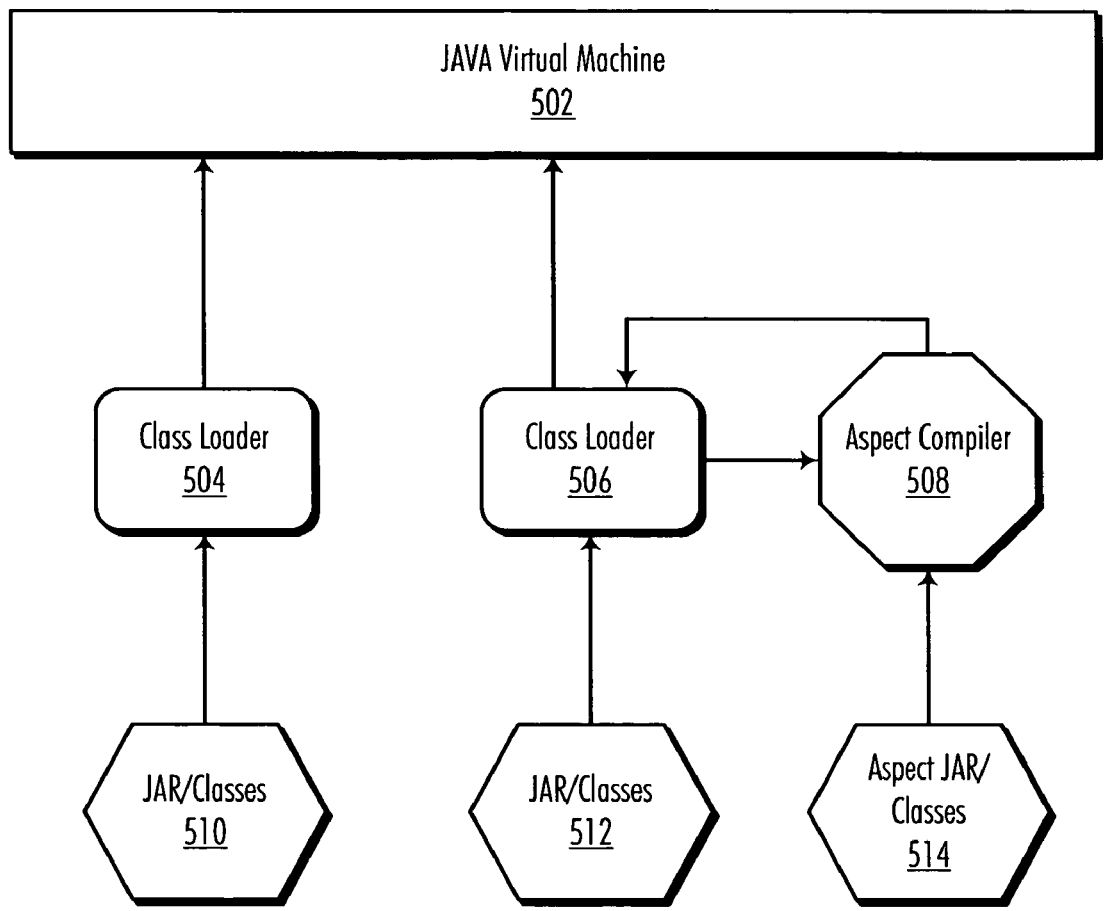
FIG. 5 is a diagram illustrating a process of instrumenting object code or bytecode dynamically at run-time as in a preferred embodiment of the present invention.

The weaving process may also be performed dynamically at runtime, as depicted in FIG. 5. In this example, a JAVA virtual machine 502 is used to execute the application. JAVA virtual machine 502 employs class loaders 504 and 506 to dynamically load and link object code in the form of JAR files and class files (e.g., JAR/classes 510 and 512). In the event that it is desired to apply aspect-oriented programming techniques in the runtime environment depicted in FIG. 5, a class loader, such as class loader 506, may be programmed to invoke an aspect compiler or weaver 508 to combine component code in the form of JAR/class files 512 with aspect JAR/class files 514 prior to dynamic linking and execution.

A preferred embodiment of the present invention monitors an application's use of the JDBC (JAVA DataBase Connectivity) interface by applying aspect-oriented programming techniques using the AspectJ language and development environment in the manner depicted in FIG. 5. AspectJ was developed by researchers at Xerox Palo Alto Research Center (PARC) and is freely available. AspectJ provides an aspect specification language and weaver for use with the JAVA programming language (as component language).

Figure 6:
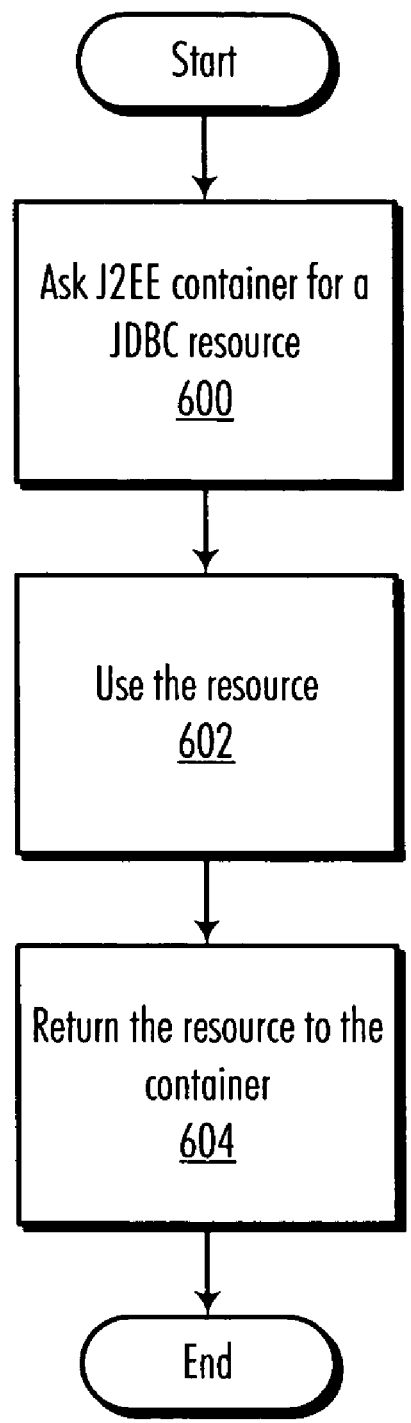
FIG. 6 is a flowchart representation of a usual process of accessing a JDBC resource from a J2EE container.

One of the capabilities provided by a preferred embodiment of the present invention is to detect JDBC-related resource leaks. A J2EE server often recycles or reuses various objects such as JDBC connections or prepared SQL statements. These objects are kept in a container or "pool" for use by different users (i.e., by different clients). When a user has finished a unit of work, the application is supposed to return these objects to the pool, where they may be reused by other users/applications. FIG. 6 is a flowchart representation of a usual process of accessing a JDBC resource from a J2EE container in this manner. The application requests a JDBC resource (object) from the container/pool (block 600). The application uses the resource (block 602) and finally returns the resource to the container after using the resource (block 604).

Figure 7:
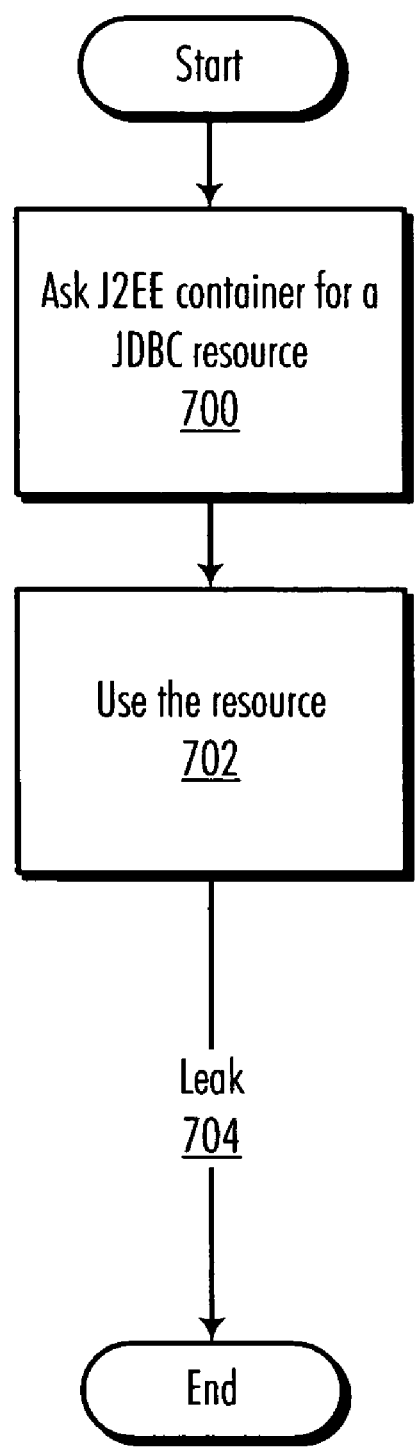
FIG. 7 is a flowchart representation of a process of accessing a JDBC resource from a J2EE container in which the resource is not returned to the container.

In certain pathological cases, an application may not return the resource to the container. FIG. 7 is a flowchart representation of a process of accessing a JDBC resource from a J2EE container in which the resource is not returned to the container. The application requests a JDBC resource (object) from the container/pool (block 700). The application uses the resource (block 702), but fails to return the resource to the container after using the resource, thus resulting in a resource leak 704.

Figure 8:
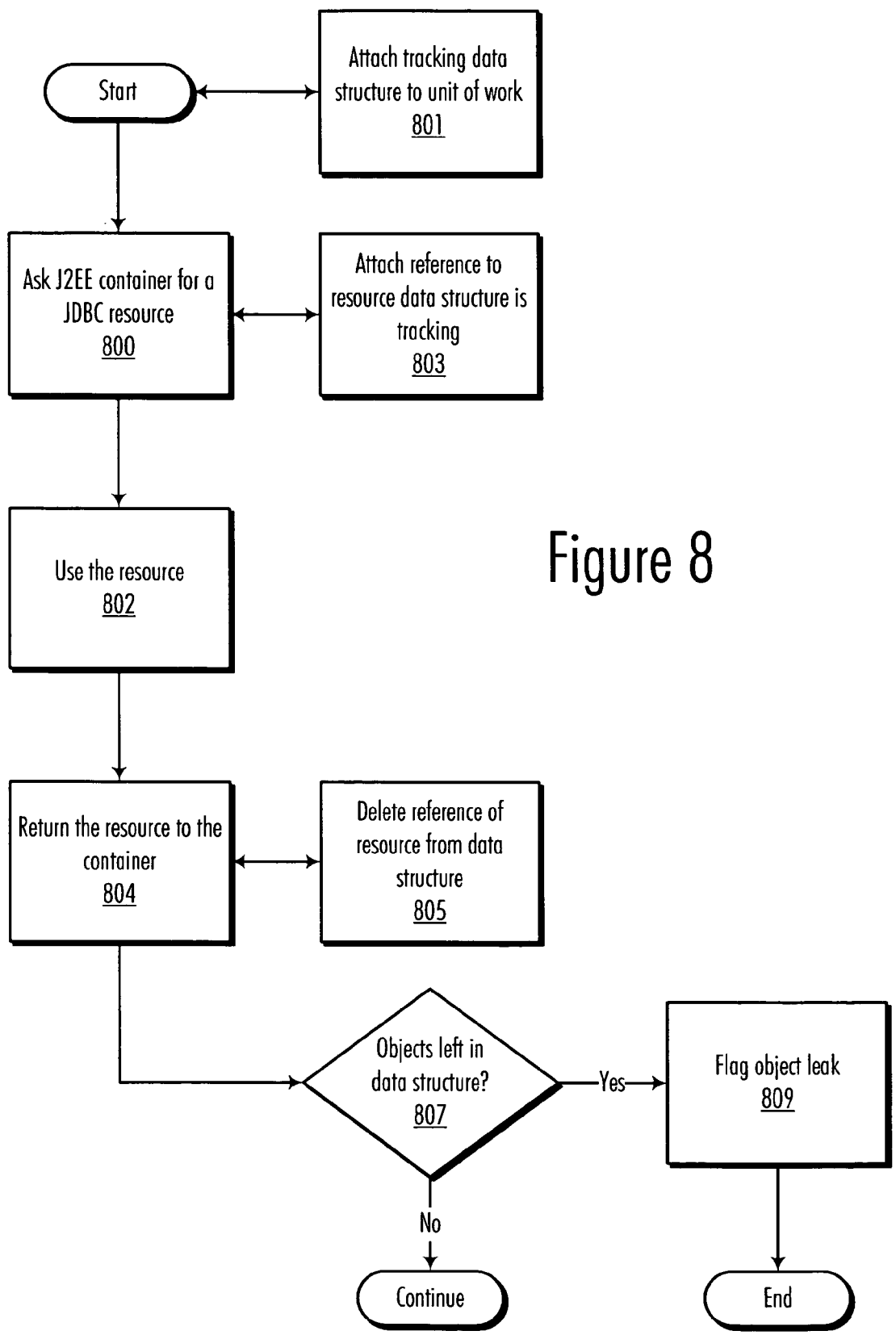
FIG. 8 is a flowchart representation of a process of accessing a JDBC resource from a J2EE container in which the program code is instrumented using aspects to detect resource leaks in accordance with a preferred embodiment of the present invention.

FIG. 8 is a flowchart representation of a process of accessing a JDBC resource from a J2EE container in which the program code is instrumented using aspects to detect resource leaks in accordance with a preferred embodiment of the present invention. When the application begins the unit of work utilizing the resource (such as a client request, for example), a pointcut intercepts this beginning of the unit of the work, and associated advice code attaches a tracking data structure to the unit of work (block 801). Then, when the application requests a JDBC resource (object) from the container/pool in the course of this unit of work (block 800), that request is intercepted by another pointcut, and associated advice code is used to attach a reference to the requested resource in the tracking data structure (block 803). After the application uses the resource (block 802) and returns the resource to the container (block 804), a pointcut intercepts this returning of the resource, and associated advice code deletes the reference to that resource in the tracking data structure (block 805).

An additional pointcut intercept the termination of this unit of work, and associated advice code determines if there are any remaining references to resources left within the tracking data structure (block 807). If there are any (block 807:Yes), then a resource leak has occurred, and that fact is flagged (e.g., by throwing an exception) to allow a user, administrator, or developer to take note of that fact (block 809). Otherwise (block 807:No), regular execution continues.

Figure 9:
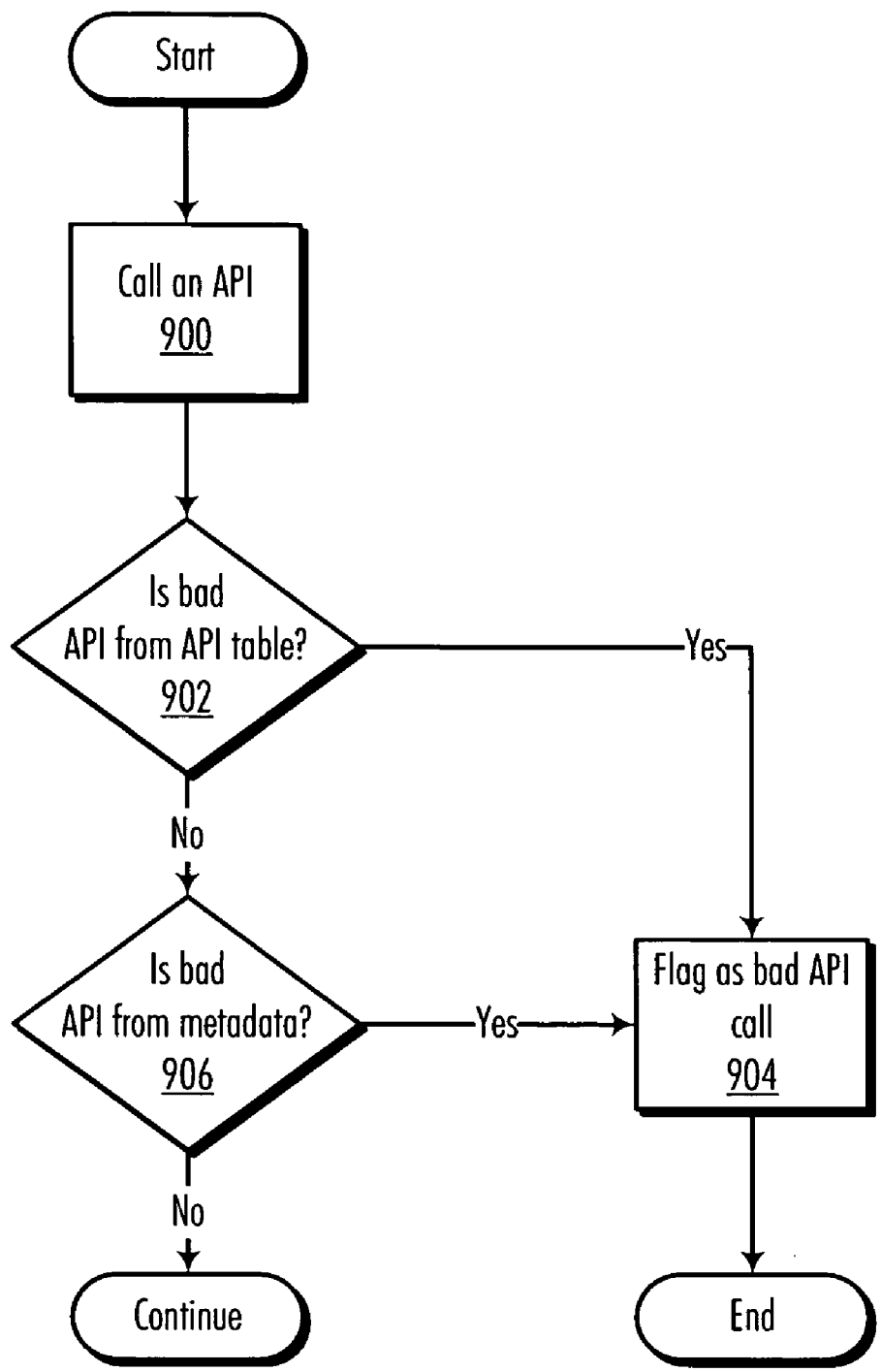
FIG. 9 is a flowchart representation of a process of detecting deprecated API calls using aspect-oriented programming in accordance with a preferred embodiment of the present invention.

FIG. 9 is a flowchart representation of a process of detecting deprecated application programming interface (API) calls using aspect-oriented programming in accordance with a preferred embodiment of the present invention. Like any other software, the JDBC data access API has progressed and continues to progress through a maturation process. Certain APIs (i.e., methods, classes, etc.) may be present within the runtime environment (and, hence, technically usable), but may be marked for deprecation, meaning that those APIs will be unsupported in the future. Generally speaking, deprecated APIs are only detected at compile time. Therefore, it is helpful to provide a manner of detecting deprecated APIs in a runtime environment, as well, to allow potential compatibility problems in existing software systems to be identified more easily.

According to the process described in FIG. 9, a pointcut is used to intercept a call to a particular API or set of APIs (such as APIs associated with JDBC, for example) (block 900). Advice code associated with that pointcut is used to determine whether the API is deprecated, either by consulting a memory table containing a list of deprecated or inadvisable APIs (block 902) or other metadata found within the source code itself (such as a "deprecated" tag for use with the standard JavaDoc documentation engine or a comparable tag for use with XDoclet or another documentation tool), which AspectJ can examine and flag accordingly (block 906). If the API is identified as deprecated, the deprecated API call is flagged as "bad" (e.g., by throwing an exception) to allow a user, administrator, or developer to determine appropriate action to take in response (block 904).

Figure 10:
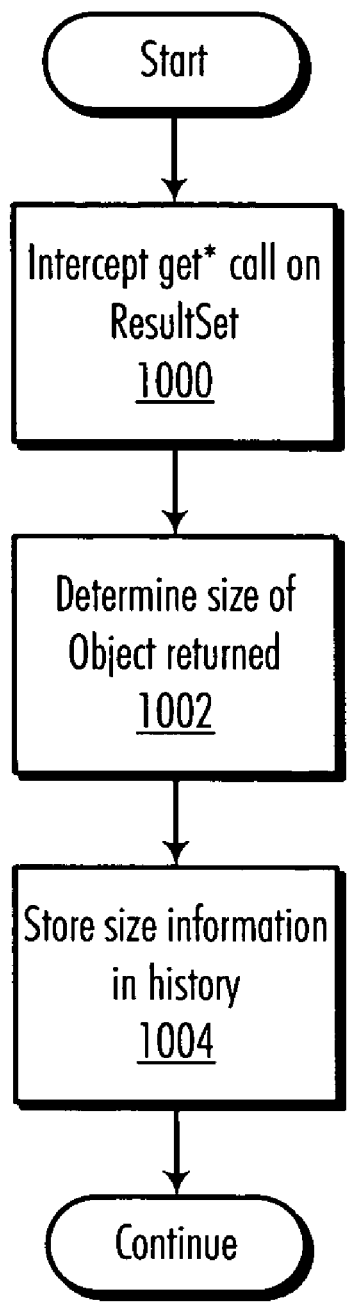
FIG. 10 is a flowchart representation of a process of recording information about the sizes of database results retrieved in accordance with a preferred embodiment of the present invention.

FIG. 10 is a flowchart representation of a process of recording information about the sizes of objects retrieved from a database in accordance with a preferred embodiment of the present invention. A pointcut is used to intercept a "get" method called on the result set (block 1000). Under the JavaBeans naming convention, methods that are used to retrieve an object or other data from another object have a name that is prefixed with "get" and are, therefore, referred to herein as "get" methods. The size of the object being retrieved by the "get" method is determined by advice code associated with the afore-mentioned pointcut (block 1002), and that size information is recorded in a history record for further analysis or presentation to a user, administrator, or developer (block 1004).

Figure 11:
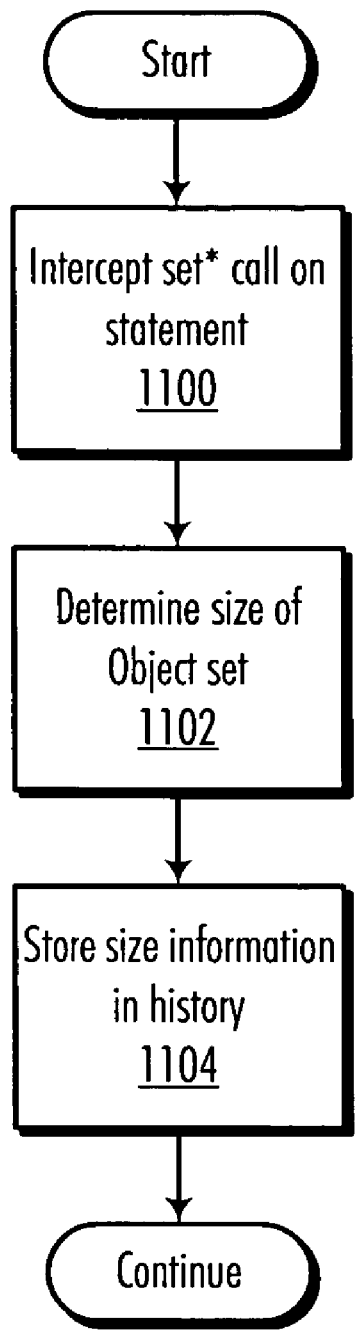
FIG. 11 is a flowchart representation of a process of recording information about the sizes of objects stored in a database in accordance with a preferred embodiment of the present invention.

FIG. 11 is a flowchart representation of a process of recording information about the sizes of objects stored in a database in accordance with a preferred embodiment of the present invention. The process depicted in FIG. 11 closely parallels that in FIG. 10. A pointcut is used to intercept a "set" method used to store an object in the data base (block 1100). Under the JavaBeans naming convention, methods that are used to store an object or other data using another object have a name that is prefixed with "set" and are, therefore, referred to herein as "set" methods. The size of the object being stored by the "set" method is determined by advice code associated with the afore-mentioned pointcut (block 1102), and that size information is recorded in a history record for further analysis or presentation to a user, administrator, or developer (block 1104).

Figure 12:
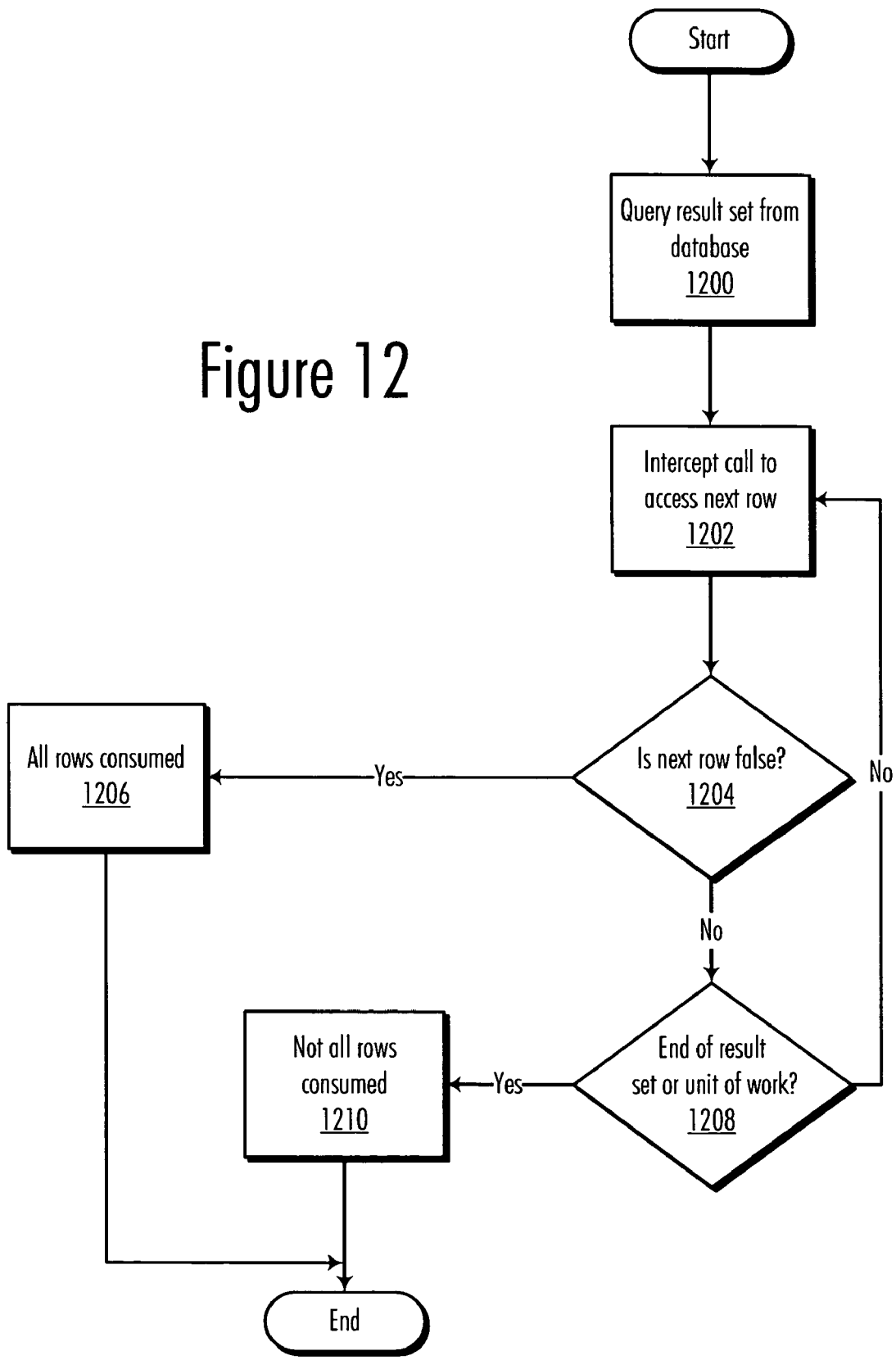
FIG. 12 is a flowchart representation of a process of determining whether results of a database query are fully used in accordance with a preferred embodiment of the present invention.

FIG. 12 is a flowchart representation of a process of determining whether the row results of a database query are fully used by an application in accordance with a preferred embodiment of the present invention. A result set of a database query is first obtained from the database (block 1200). Each call to access the next row in the result set is intercepted using an appropriate pointcut (block 1202). At this point, advice code determines whether there is a next row to access or whether the result of attempting to access the next row will come up false, indicating that there are no more rows to access (block 1204). If the result comes up false (block 1204:Yes), the advice code records that all rows were consumed by the application (block 1206).

Otherwise (block 1204:No), a determination is made as to whether the application has completed its use of the result set (block 1208). If so (block 1208:Yes), then advice code is used to record the fact that not all of the rows of the result set were used (block 1210). If not (block 1208:No), then the process continues to intercept a subsequent call to access the next row in the result set (block 1202).

Figure 13:
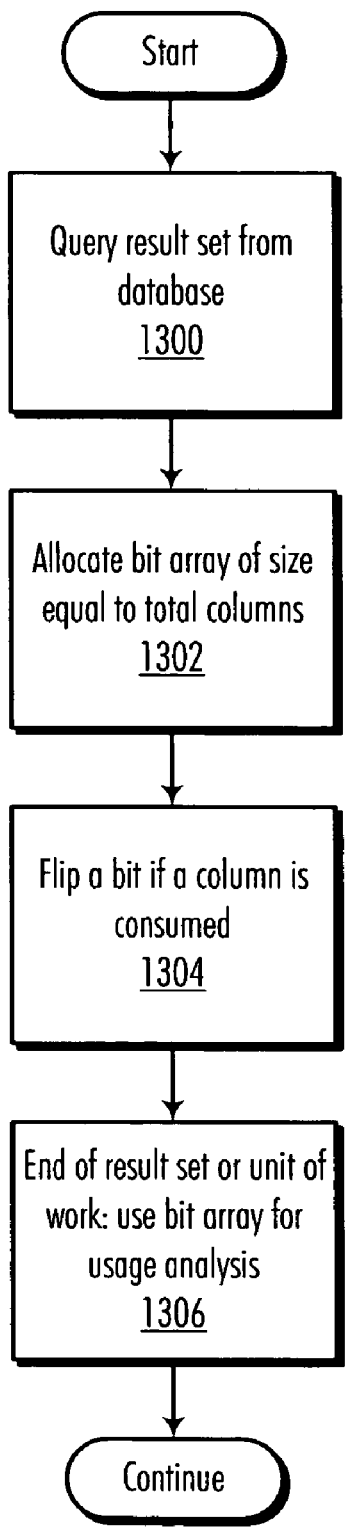
FIG. 13 is a flowchart representation of a process of recording database column usage using aspect-oriented programming in accordance with a preferred embodiment of the present invention.

FIG. 13 is a flowchart representation of a process of recording database column usage using aspect-oriented programming in accordance with a preferred embodiment of the present invention. A result set of a database query is first obtained from the database (block 1300). When this result is obtained, a pointcut is used to intercept this querying of the database, and advice code associated with that pointcut allocates an array of bits (all zeros or all ones), with each bit representing a column in the result set (block 1302). As data in each column is used by the program, an additional pointcut intercepts this usage, and advice code associated with the additional pointcut inverts ("flips") the bit associated with that column (block 1304). Once usage of the result set has ended, the bit array may be used to analyze the column usage associated with that query (block 1306).

Figure 14:
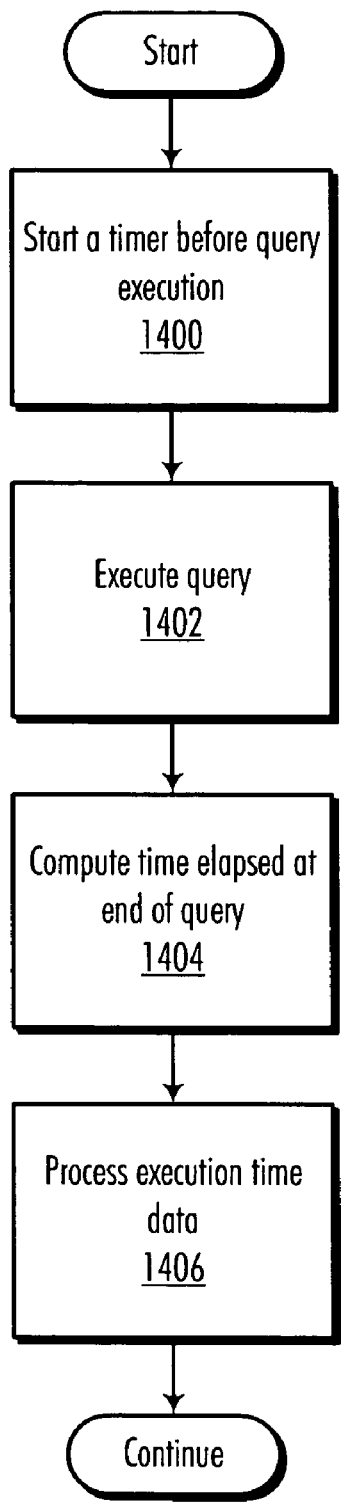
FIG. 14 is a flowchart representation of a process of monitoring query processing time using aspect-oriented programming in accordance with a preferred embodiment of the present invention.

FIG. 14 is a flowchart representation of a process of monitoring query processing time using aspect-oriented programming in accordance with a preferred embodiment of the present invention. In this embodiment, an aspect is defined having a pointcut that intercepts the submission of queries to the database. This aspect causes before advice to be executed before the query itself executes, where the before advice starts a timer or records a starting time (block 1400). The query is allowed to execute (block 1402). Then, after advice is executed to compute the elapsed time (block 1404) and further process the computed time (e.g., by recording the elapsed time for future use) (block 1406).

Figure 15:
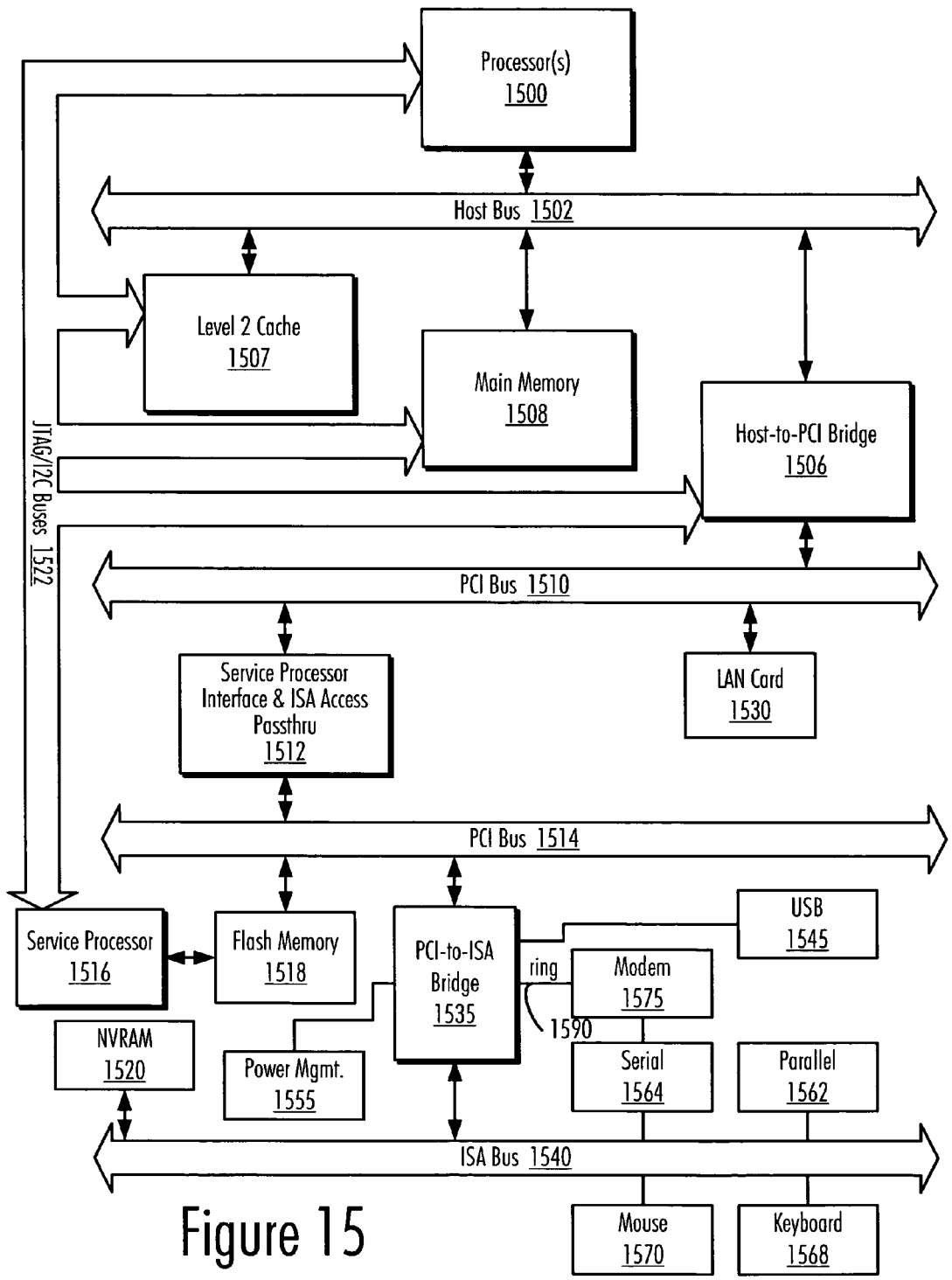
FIG. 15 is a block diagram of a data processing system in which a preferred embodiment of the present invention may be implemented.

FIG. 15 illustrates information handling system 1501, which is a simplified example of a computer system capable of performing the computing operations of the host computer described herein with respect to a preferred embodiment of the present invention. Computer system 1501 includes processor 1500 which is coupled to host bus 1502. A level two (L2) cache memory 1504 is also coupled to host bus 1502. Host-to-PCI bridge 1506 is coupled to main memory 1508, includes cache memory and main memory control functions, and provides bus control to handle transfers among PCI bus 1510, processor 1500, L2 cache 1504, main memory 1508, and host bus 1502. Main memory 1508 is coupled to Host-to-PCI bridge 1506 as well as host bus 1502. Devices used solely by host processor(s) 1500, such as LAN card 1530, are coupled to PCI bus 1510. Service Processor Interface and ISA Access Pass-through 1512 provides an interface between PCI bus 1510 and PCI bus 1514. In this manner, PCI bus 1514 is insulated from PCI bus 1510. Devices, such as flash memory 1518, are coupled to PCI bus 1514. In one implementation, flash memory 1518 includes BIOS code that incorporates the necessary processor executable code for a variety of low-level system functions and system boot functions.

PCI bus 1514 provides an interface for a variety of devices that are shared by host processor(s) 1500 and Service Processor 1516 including, for example, flash memory 1518. PCI-to-ISA bridge 1535 provides bus control to handle transfers between PCI bus 1514 and ISA bus 1540, universal serial bus (USB) functionality 1545, power management functionality 1555, and can include other functional elements not shown, such as a real-time clock (RTC), DMA control, interrupt support, and system management bus support. Nonvolatile RAM 1520 is attached to ISA Bus 1540. Service Processor 1516 includes JTAG and I2C buses 1522 for communication with processor(s) 1500 during initialization steps. JTAG/I2C buses 1522 are also coupled to L2 cache 1504, Host-to-PCI bridge 1506, and main memory 1508 providing a communications path between the processor, the Service Processor, the L2 cache, the Host-to-PCI bridge, and the main memory. Service Processor 1516 also has access to system power resources for powering down information handling device 1501.

Peripheral devices and input/output (I/O) devices can be attached to various interfaces (e.g., parallel interface 1562, serial interface 1564, keyboard interface 1568, and mouse interface 1570 coupled to ISA bus 1540. Alternatively, many I/O devices can be accommodated by a super I/O controller (not shown) attached to ISA bus 1540.

In order to attach computer system 1501 to another computer system to copy files over a network, LAN card 1530 is coupled to PCI bus 1510. Similarly, to connect computer system 1501 to an ISP to connect to the Internet using a telephone line connection, modem 1575 is connected to serial port 1564 and PCI-to-ISA Bridge 1535.

While the computer system described in FIG. 15 is capable of supporting the methods described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. In a data processing system having a processor, a method comprising:

the processor executing program code that performs the function of instrumenting an application with a first aspect, wherein the first aspect is associated with aspect source code that defines a pointcut identifying a database-related operation and wherein the first aspect is associated with an advice code that identifies a characteristic of the database-related operation and determines whether a database-related resource is returned to a pool of resources after being used by the application; and instrumenting the application with a second aspect, wherein the second aspect is associated with the pointcut identifying a second database-related operation and wherein the second aspect is associated with advice code that identifies the characteristic of the second database-related operation.

2. The method of claim 1, wherein the characteristic of the second database-related operation is whether the database-related operation is a call to a deprecated application programming interface (API).

3. The method of claim 1, wherein the characteristic of the second database-related operation indicates whether all rows of a database result set are used by the application.

4. The method of claim 1, wherein the characteristic of the second database-related operation indicates which columns of a database result set are used by the application.

5. The method of claim 1, wherein the characteristic of the second database-related operation is a size of an object handled by the second database-related operation.

6. The method of claim 1, wherein the characteristic of the second database-related operation is an elapsed time for the second database-related operation.

7. A computer program product stored in a non-transitory computer readable medium comprising functional descriptive material that, when executed by a computer, directs the computer to perform actions that include:

instrumenting an application with a first aspect, wherein the first aspect is associated with aspect code that defines a pointcut identifying a first database-related operation and wherein the first aspect is associated with an advice code that identifies a characteristic of the database-related operation and determines whether a database-related resource is returned to a pool of resources after being used by the application; and instrumenting the application with a second aspect, wherein the second aspect is associated with the pointcut identifying a second database-related operation and wherein the second aspect is associated with advice code that identifies the characteristic of the second database-related operation.

8. The computer program product of claim 7, wherein the characteristic of the second database-related operation is whether the second database-related operation is a call to a deprecated application programming interface (API).

9. The computer program product of claim 7, wherein the characteristic of the second database-related operation indicates whether all rows of a database result set are used by the application.

10. The computer program product of claim 7, wherein the characteristic of the second database-related operation indicates which columns of a database result set are used by the application.

11. The computer program product of claim 7, wherein the characteristic of the second database-related operation is a size of an object handled by the second database-related operation.

12. The computer program product of claim 7, wherein the characteristic of the second database-related operation is an elapsed time for the second database-related operation.

13. A data processing system comprising:

at least one processor;

at least one data store associated with the at least one processor; and a set of instructions in the at least one data store, wherein the at least one processor executes the set instructions to perform actions that include:

instrumenting an application with a first aspect, wherein the first aspect is associated with aspect code that defines a pointcut identifying a first database-related operation and wherein the first aspect is associated with an advice code that identifies a characteristic of the database-related operation and determines whether a database-related resource is returned to a pool of resources after being used by the application; and instrumenting the application with a second aspect, wherein the second aspect is associated with the pointcut identifying a second database-related operation and wherein the second aspect is associated with advice code that identifies the characteristic of the second database-related operation.

14. The data processing system of claim 13, wherein the characteristic of the second database-related operation is whether the second database-related operation is a call to a deprecated application programming interface (API).

15. The data processing system of claim 13, wherein the characteristic of the second database-related operation indicates which columns of a database result set are used by the application.

16. The data processing system of claim 13, wherein the characteristic of the second database-related operation is a size of an object handled by the second database-related operation.

17. The data processing system of claim 13, wherein the characteristic of the second database-related operation is an elapsed time for the second database-related operation.

* * * * *